United States Patent
Tsuchiya

[19]

[11] Patent Number: 6,080,353
[45] Date of Patent: Jun. 27, 2000

[54] METHOD OF MOLDING A HEAT-RESISTANT CONTAINER

[75] Inventor: Yoichi Tsuchiya, Kuruizawa-machi, Japan

[73] Assignee: Nissei ASB Machine Co., Ltd., Nagono-Ken, Japan

[21] Appl. No.: 09/028,867

[22] Filed: Feb. 13, 1998

[30] Foreign Application Priority Data

Feb. 17, 1997 [JP] Japan ................................. 9-048416
Jan. 13, 1998 [JP] Japan ................................ 10-017933

[51] Int. Cl.[7] ................................................ B29C 49/18
[52] U.S. Cl. .......................... 264/458; 521/530; 521/903; 521/904; 521/906
[58] Field of Search ................................. 264/458, 521, 264/530, 906, 904, 905, 903

[56] References Cited

U.S. PATENT DOCUMENTS

| | | | |
|---|---|---|---|
| 3,865,912 | 2/1975 | Rosenkranz et al. | 264/521 |
| 4,550,007 | 10/1985 | Ohtsu et al. | 264/521 |
| 5,248,533 | 9/1993 | Sugiura et al. | 264/906 |
| 5,308,233 | 5/1994 | Denis et al. | 425/151 |
| 5,378,421 | 1/1995 | Salame | 264/906 |
| 5,382,157 | 1/1995 | Denis et al. | 425/526 |
| 5,501,590 | 3/1996 | Orimoto et al. | 425/526 |
| 5,520,877 | 5/1996 | Collette et al. | 264/521 |
| 5,585,065 | 12/1996 | Nakamaki et al. | 264/906 |
| 5,641,451 | 6/1997 | Orimoto et al. | 264/906 |

FOREIGN PATENT DOCUMENTS

| | | |
|---|---|---|
| 2212926 | 8/1996 | Canada . |
| 0155763 | 9/1985 | European Pat. Off. . |
| 2730471 | 8/1996 | France . |
| 54-041973 | 4/1979 | Japan .................................. 264/904 |
| 58-220711 | 12/1983 | Japan .................................. 264/530 |
| 60-112419 | 6/1985 | Japan .................................. 264/530 |
| 8-187768 | 7/1996 | Japan .................................. 264/530 |

*Primary Examiner*—Catherine Timm
*Attorney, Agent, or Firm*—David L. Hoffman, Esq.; Cisco & Thomas LLP

[57] ABSTRACT

A method of molding a heat-resistant container comprising a primary blow molding step, a primary heat treatment step, a secondary heat treatment step, and a secondary blow molding step. In the primary blow molding step a synthetic resin preform is blow-molded into a primary blow-molded article. In the primary heat treatment step, the primary blow-molded article is held in a heat treatment mold and subjected to heat treatment. The primary blow-molded article, removed from the mold, shrinks, and forms an intermediate molded article. In the secondary heat treatment step, the intermediate molded article is subjected to heat treatment outside the mold. At this time, almost no shrinkage occurs. In the secondary blow molding step, the intermediate molded article is blow molded within a final blow mold to form a final molded product.

13 Claims, 4 Drawing Sheets

METHOD OF MOLDING A HEAT-RESISTANT CONTAINER

BACKGROUND OF THE INVENTION

1. Field of the Invention

The present invention relates to a method of molding a heat-resistant container, and in particular to a method of molding a heat-resistant container from a synthetic resin such as polyethylene terephthalate (PET).

2. Description of the Related Art

Generally, a thin-walled packaging container of synthetic resin known as a biaxially stretch blow molded container is obtained by forming a preform by injection molding or extrusion, and disposing the preform in a blow mold, then stretching the preform longitudinally with a stretching rod while stretching the preform laterally by means of the pressure of a gas blown into the preform.

However, depending on the resin material used to form the container, if the container is filled with heated contents, such as a heat-sterilized fruit juice drink, there is a heat-resistance problem in that the container may be deformed. For example, a PET container formed by conventional blow molding as described above does not have heat resistance.

Various methods have been proposed for imparting heat resistance to a PET container.

For example, in Japanese Patent Application Laid-Open No. 8-187768 (corresponding to U.S. patent application No. 08/544,544) by the assignee of the present application is proposed a method of molding a heat-resistant container.

This method of molding a heat-resistant container comprises the following three steps. First, the preform is subjected to primary blow molding, to form a primary blow-molded article whose length in the long axis is longer than that of the finished product. Next, in a heat treatment mold having a cavity surface substantially of the same shape of the outer surface of the primary blow-molded article, the primary blow-molded article is subjected to heat treatment at a temperature (150 to 220° C.) to promote crystallization of the PET resin. Finally, the intermediate article removed from the heat treatment mold and in the softened and shrunken state is blow molded in a final blow mold having a cavity surface whose shape is the same as that of the finished product, thus forming a final product with heat resistance.

According to this method of molding a heat-resistant container, a container with excellent heat resistance can be formed, and among many other benefits, the required heat treatment can be carried out in a short time, and the shape and size of the shrunken intermediate article after heat treatment is stable.

The above method, by using a heat treatment mold, yields vastly better production efficiency, since the heating efficiency is higher than with the conventional technique of using hot air. However, compared with the manufacturing cycle for containers for carbonated drinks and the like which do not require heat resistance, a long time is required for heat treatment in the heat treatment mold of the above method, and further improvements in production efficiency are sought.

Moreover, as a result of the fall in temperature of the intermediate article in the interval after the heat treatment step and until the final blow molding step, the final molded product may not be precisely blow-molded according to design in the final blow molding, and there is the problem of a loss of dimensional accuracy. As factors in this temperature drop may be cited the removal of air from within the primary blow-molded article after the heat treatment is completed, and the transport of the intermediate article from the heat treatment step to the final blow molding step.

The heat treatment mold used in the second, heat treatment, step comprises a neck support member (for example a neck guide member) supporting the neck portion of the primary blow-molded article, a cavity mold coming into contact with the body of the primary blow-molded article, and a bottom mold coming into contact with the bottom of the primary blow-molded article. Here, while the cavity mold is heated to between 150 and 220° C., the crystallization temperature, the neck support member and bottom mold are maintained at a lower temperature (30 to 100° C.). For this reason, the temperature of the cavity mold tends to fall below the temperature of crystallization in the two borderline regions adjacent to the neck support member and to the bottom mold because of the heat flow in those regions.

These two regions correspond to a first portion extending from the lower part of the neck to the shoulder of the primary blow-molded article and a second portion extending from the base to the heel of the primary blow-molded article, and there is a danger that crystallization will be inadequate in these regions. As a result, the heat resistance of these two portions tends to be inferior to the heat resistance of other portions.

Moreover, these first and second portions are thicker than other parts of the container, and thus harder to heat, and further have a low degree of orientation from the primary blow molding step, as a result of which there is a tendency for the heat resistance to be further impaired by comparison with other portions.

SUMMARY OF THE INVENTION

The object of the present invention is the provision of a method of molding a heat-resistant container, which provides further improvement in heat resistance, improvement in production efficiency, and improvement in dimensional accuracy.

Another object of the present invention is the provision of a method of molding a heat-resistant container, which by stabilizing the shape and dimensions of an intermediate molded article provides improvement in production efficiency and improvement in dimensional accuracy.

A further object of the present invention is the provision of a method of molding a heat-resistant container, providing improved heat resistance in the shoulder and heel portions.

In order to achieve these objects, there is provided a method of molding a heat-resistant container comprising:

a primary blow molding step in which a preform of a synthetic resin is blow-molded into a primary blow-molded article;

a primary heat treatment step in which the primary blow-molded article is held in a heated mold and heat treated;

a secondary heat treatment step in which a shrunken intermediate molded article removed from the mold is subjected to heat treatment outside the mold; and a secondary blow molding step in which the intermediate molded article having been subjected to heat treatment outside the mold is blow-molded into a final molded product in a final blow mold.

The primary blow-molded article heat treated within the mold in the primary heat treatment step has its crystallization promoted, and by means of the shrinkage occurring when removed from the mold forms an intermediate molded article with the residual strain eliminated.

Furthermore, by subjecting the intermediate molded article in the softened and shrunken state to heat treatment outside the mold in the secondary heat treatment step, crystallization is further promoted, and the heat resistance of the final molded product can be improved. Moreover, during the secondary blow molding the intermediate molded article can be assured of attaining an appropriate temperature for stretching. That is to say, by means of the secondary heat treatment step the fall in temperature of the intermediate molded article due to the evacuation after the primary heat treatment step or due to the transport of the intermediate molded article after this evacuation can be eliminated. As a result, deterioration of the dimensional accuracy of the final molded product due to a fall in temperature in the secondary blow molding step can be prevented.

Even if the heat treatment time within the mold in the primary heat treatment step is reduced, heat treatment can be further carried out outside the mold in the secondary heat treatment step, and therefore the molding cycle can be shortened, and the production efficiency can be greatly improved. In the secondary heat treatment step, since a mold which would have a relatively high manufacturing cost is not required, there is no large increase in the cost of the blow molding machine.

According to another aspect of the present invention, there is provided a method of molding a heat-resistant container comprising:

a primary blow molding step in which a preform of a synthetic resin is blow-molded into a primary blow-molded article;

a primary heat treatment step in which the primary blow-molded article is held in a heated mold and heat treated;

a secondary heat treatment step in which a shrunken intermediate molded article removed from the mold is subjected to heat treatment outside the mold; and a secondary blow molding step in which the intermediate molded article having been subjected to heat treatment outside the mold is blow-molded into a final molded product in a final blow mold;

wherein in the primary blow molding step the longitudinal length of the primary blow-molded article is formed to be longer than the longitudinal length of the final molded product;

wherein the longitudinal and lateral dimensions of the shrunken intermediate molded article removed from the mold after the primary heat treatment step are slightly less than the longitudinal and lateral dimensions of the final molded product; and wherein in the secondary heat treatment step, heat treatment is carried out with almost no shrinkage of the intermediate molded article.

By making the primary blow-molded article larger than the final molded product, by means of the shrinkage after the primary heat treatment step the longitudinal and lateral dimensions of the intermediate molded article are slightly smaller than those of the final molded product. Further, by means of the shrinkage after the primary heat treatment, the intermediate molded article has the residual stress in the primary blow-molded article almost completely eliminated. Therefore, even if the intermediate molded article is subjected to secondary heat treatment outside the mold, there is almost no shrinkage deformation of the intermediate molded article. For this reason, an intermediate molded article of always stable size can be disposed within the final blow mold, whereby pinching of the intermediate molded article when the mold is closed can be prevented. Again, in the secondary blow molding step the final molded product can be molded almost without stretching the intermediate molded article. Therefore, in the final molded product strain due to stretching in the secondary blow molding step is almost nonexistent.

According to yet another aspect of the invention, there is provided a method of molding a heat-resistant container comprising:

a primary blow molding step in which a preform of a synthetic resin is blow-molded into a primary blow-molded article;

a primary heat treatment step in which the primary blow-molded article is held in a heated mold and heat treated;

a secondary heat treatment step in which a shrunken intermediate molded article removed from the mold is subjected to heat treatment outside the mold; and a secondary blow molding step in which the intermediate molded article having been subjected to heat treatment outside the mold is blow-molded into a final molded product in a final blow mold;

wherein the intermediate molded article includes a neck portion with an opening, a tubular body portion, a bottom portion sealing one end of the body portion, a shoulder portion joining the neck portion and the body portion, and a heel portion joining the body portion and the bottom portion; and wherein in the secondary heat treatment step, heat treatment is carried out with the quantity of heat supplied to each of the shoulder and the heel portions being greater than the quantity of heat supplied to the body portion.

Since the portions close to the shoulder portion and heel portion, which in particular tend to have a reduction in heat resistance, can be positively heated more than other portions, the heat resistance can be improved.

The primary heat treatment step may include a step in which the interior of the primary blow-molded article disposed within the mold is pressurized and subjected to heat treatment, and a step in which after the heat treatment is completed the interior of the primary blow-molded article is evacuated. Moreover, in the secondary heat treatment step, the intermediate molded article may be subjected to heat treatment without introducing a compressed gas into the intermediate molded article.

The reason for this is that even if the molded article temperature falls after the primary heat treatment step in which the interior of the primary blow-molded article is evacuated, heating to a temperature appropriate for stretching can be carried out in the secondary heat treatment step. Since there is no necessity to evacuate the intermediate molded article after the secondary heat treatment step, a large fall in the temperature of the intermediate molded article before the secondary blow molding step can be prevented. Furthermore, since no compressed gas is introduced into the intermediate molded article, a mold to preserve the external shape of the intermediate molded article is not required.

The heat treatment temperature of the intermediate molded article in the secondary heat treatment step may be at least the temperature of the mold in the primary heat treatment step. This is because even if the heat treatment time of the primary heat treatment step is reduced, the insufficiency of heat treatment effect can be compensated by the secondary heat treatment step. As a result, the production efficiency is improved, while ensuring the heat resistance of the containers.

The secondary heat treatment step may be carried out by means of a plurality of infrared heaters disposed alongside the intermediate molded article. The reason for this is that the synthetic resin of which the intermediate molded article is formed absorbs infrared radiation easily, and can be heat-treated efficiently. In particular, in the secondary heat treatment step, since there is almost not shrinkage of the intermediate molded article, infrared heaters in fixed positions can be used, and heat treatment can be carried out without necessarily requiring a means to restrict the shrinkage of the intermediate molded article. If infrared heaters were used in the heat treatment of the primary blow-molded article, the size of the primary blow-molded article would change greatly during the heat treatment, and the heater positioning, temperature control, and other aspects would be difficult. Using infrared heaters in the secondary heat treatment step, such heater positioning and temperature adjustment is almost not required. It should be noted that the secondary heat treatment step may equally be carried out by directing hot air at the outer surface of the intermediate molded article. Again, whichever heating method is adopted, in the secondary heat treatment step, if the intermediate molded article is rotated, uniformity of heating in the circumferential direction can be assured.

Of the plurality of infrared heaters, the heaters principally heating the shoulder portion and the heel portion of the intermediate molded article may be disposed closer to the longitudinal axis of the intermediate molded article than others of the heaters. Since the portions close to the shoulder portion and heel portion, which in particular tend to have a reduction in heat resistance, can be positively heated more than other portions, the heat resistance of these portions can be improved.

The temperature of the mold used in the primary heat treatment step may be in the range of 150 to 220° C., and the heat treatment time may be in the range of 2 to 10 seconds. With the above mold temperature, crystallization of the primary blow-molded article can be effectively promoted in a short time, and the production efficiency can be improved.

The same mold may be both the mold used for heat treatment in the primary heat treatment step and the mold used for primary blow molding in the primary blow molding step, or distinct molds may be provided. If separate molds for primary blow molding and for primary heat treatment are provided, the time required for heat treatment can be deducted from the time required for the primary blow molding step, and the molding cycle can be shortened. At this time, the shape of the internal cavity of the primary blow mold used in the primary blow molding stage and the shape of the internal cavity of the heat treatment mold used in the primary heat treatment stage can be substantially the same.

The final blow mold used in the secondary blow molding step may be heated to a temperature of at least the glass-transition point of the synthetic resin, and at least the temperature required for heat resistance of the final molded product. By this means, the slight amount of strain generated in the secondary blow molding can be eliminated, and even if the final molded product is later exposed to the heat resistance temperature, no shrinkage will occur.

DESCRIPTION OF THE PREFERRED EMBODIMENTS

An embodiment of the present invention is now described with reference to the drawings.

Figure 1:
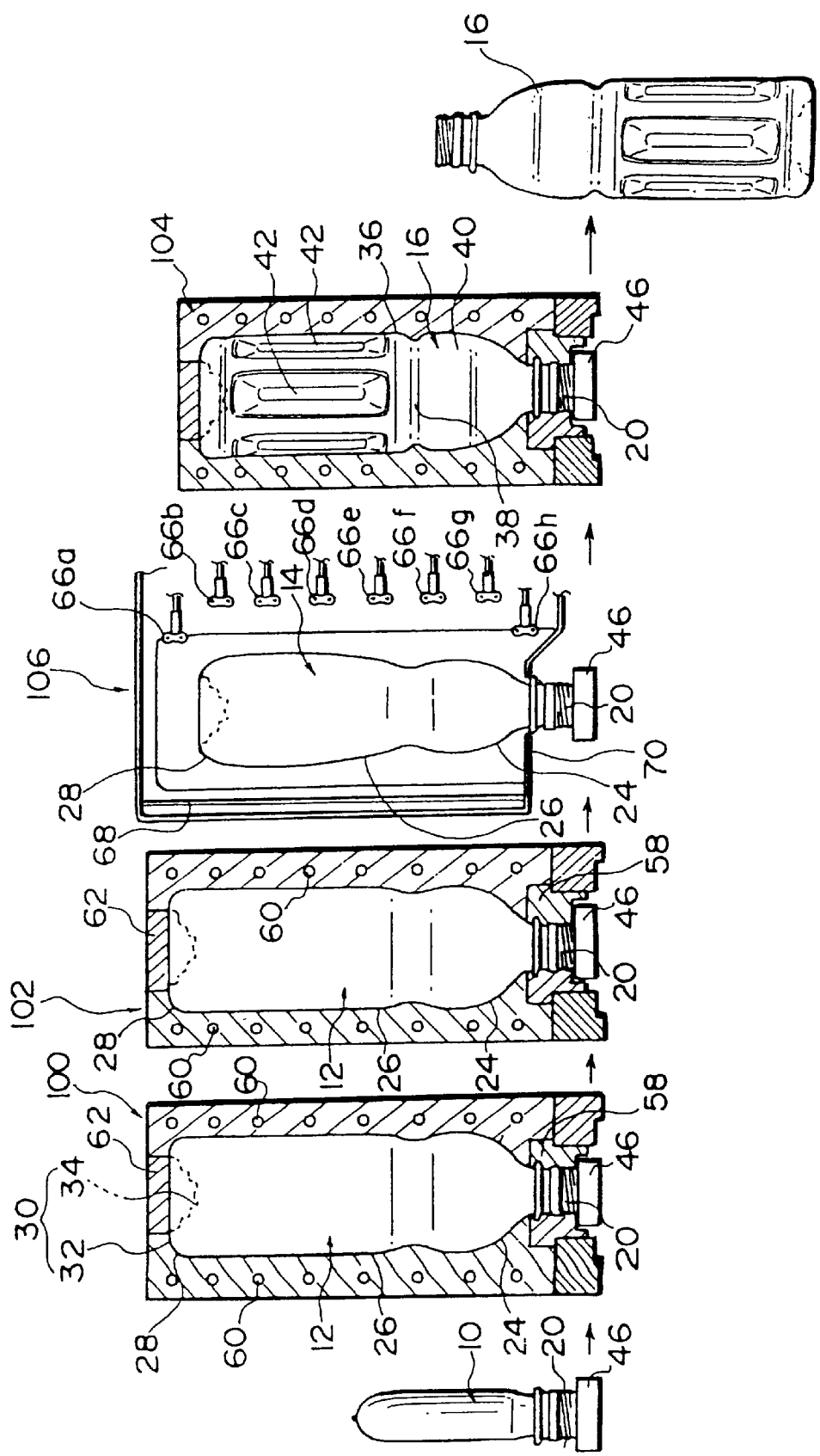
FIG. 1 is an illustration of the steps in an embodiment of the method of molding a heat-resistant container of the present invention.

FIG. 1 shows the steps in an embodiment of the method of molding a heat-resistant container of the present invention.

This method of molding a heat-resistant container comprises broadly five steps. In the first step a preform 10 shown in FIG. 1 is formed. In the second step, within a primary blow mold 100 shown in FIG. 1, the preform 10 is blow-molded into a primary blow-molded article 12. In the third step, within a heat treatment mold 102 shown in FIG. 1, primary heat treatment is applied to the primary blow-molded article 12. In the fourth step, an intermediate molded article 14 in shrunken form after primary heat treatment is subjected to secondary heat treatment outside a mold. In the fifth step, within a final blow mold 104 shown in FIG. 1, the intermediate molded article 14 which has been subjected to secondary heat treatment is blow-molded into a final molded product 16.

FIGS. 2A to 2d show the articles 10, 12, 14, and 16 aligned so that their sizes can be compared. It should be noted that in the this embodiment the articles are formed in the inverted orientation, and therefore the articles are also shown in FIGS. 2A to 2D in the inverted orientation. These articles 10, 12, 14, and 16 are now described in sequence.

(A) Preform 10

The preform 10 is formed of PET by a well-known method of injection molding, and has a body 18 in the form of a tube with a bottom, and a neck portion 20 formed at the open end of the body 18.

The neck portion 20 has a threaded portion 22 to which a cap not shown in the drawings can be attached. The neck portion 20 is not subject to orientation in the subsequent blow molding steps. To impart heat resistance to this neck portion 20, the neck portion 20 may be heated and cooled slowly to promote crystallization (whitening crystallization), a heat-resistant piece is inserted in the neck portion 20, or the neck portion 20 is formed in a laminated way with PET resin and a heat-resistant resin.

It should be noted that if the preform 10 is made of PEN (polyethylene naphthalate), it may not always be necessary to impart heat resistance to the neck portion 20.

(B) Primary blow-molded article 12

Figure 2:
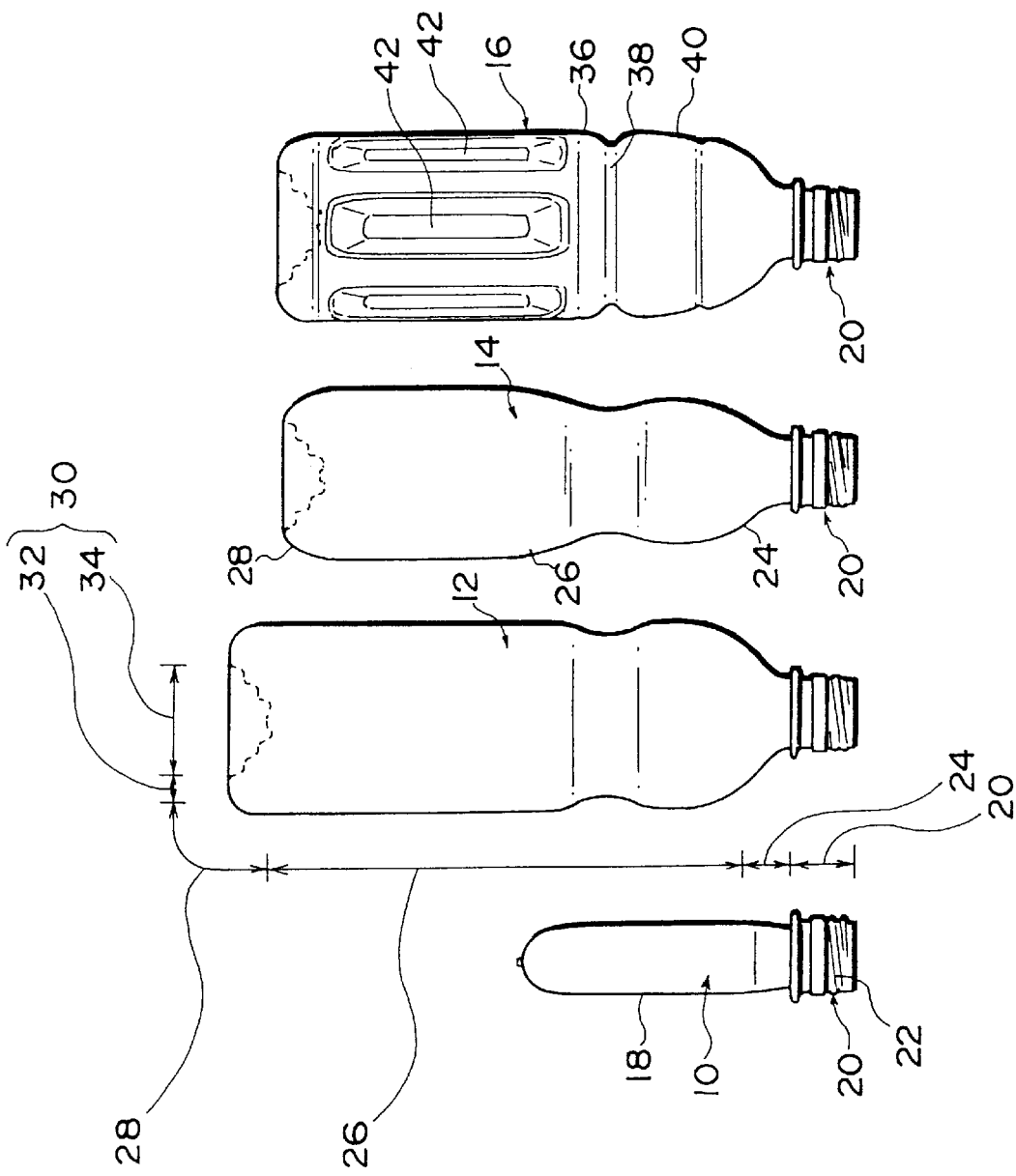
FIGS. 2A to 2D are enlarged views showing the article in the various steps of FIG. 1.
Figure 3:
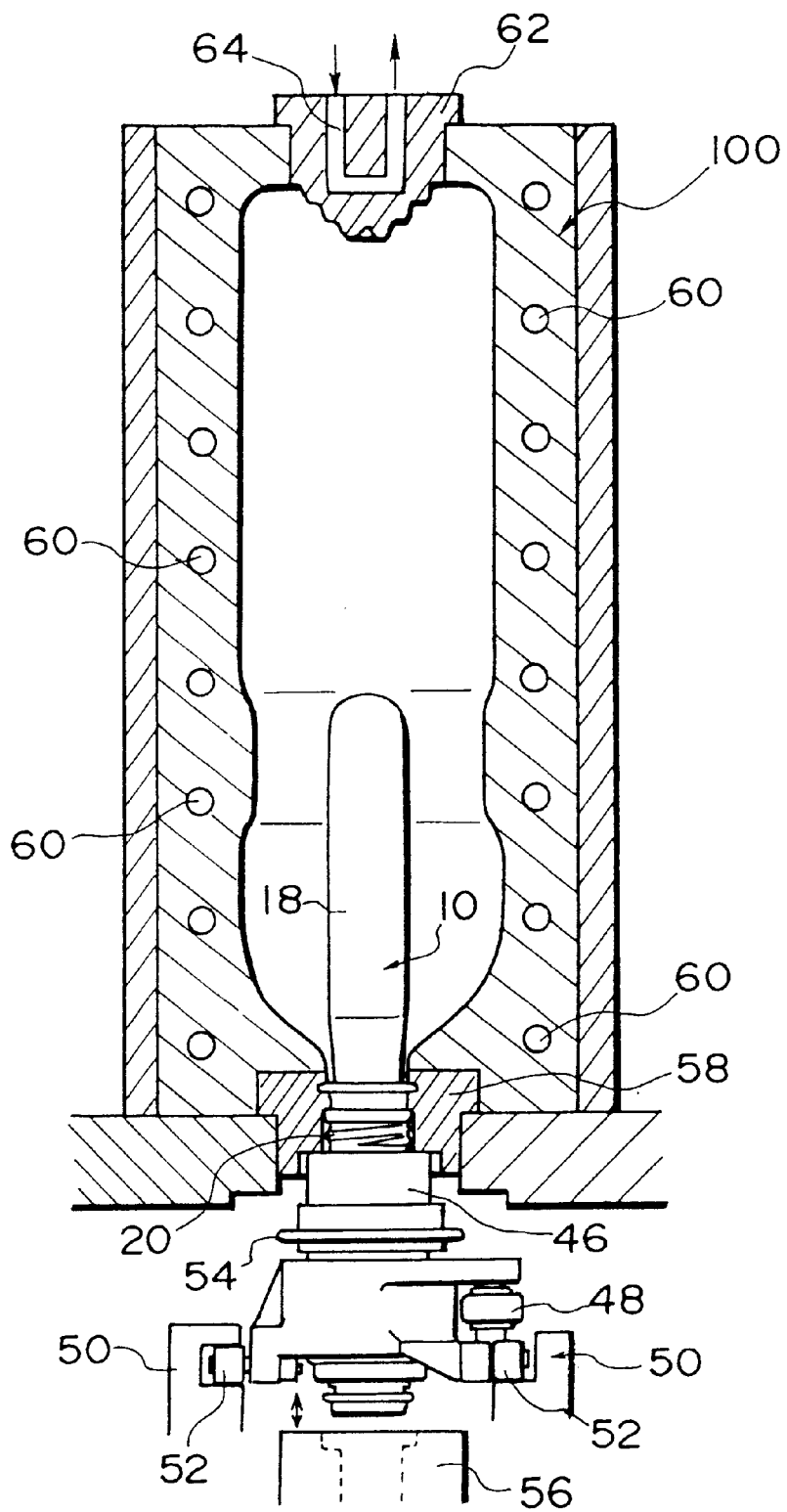
FIG. 3 is a sectional diagram showing a primary blow mold in a primary blow molding step.

The primary blow-molded article 12 is obtained within the primary blow mold 100 shown in FIGS. 1 and 3, by biaxial stretch blow molding of the preform 10, using a stretching rod and compressed gas. The vertical length of this primary blow-molded article 12, as can be seen from a comparison of FIGS. 2B and 2D, is longer than that of the final blow-molded product 16. It should be noted that the temperature of the primary blow mold 100 can be adjusted so that after the cooling and removal of the primary blow-molded article 12, no large shrinkage deformation of the primary blow-molded article 12 occurs.

The size of this primary blow-molded article 12 is determined by considering the size of the intermediate molded article 14 obtained by subsequent shrinking of the primary blow-molded article 12 by heat treatment. However, the degree of shrinkage from the primary blow-molded article 12 to the intermediate molded article 14 is affected by various forming conditions. Therefore, according to the forming conditions for obtaining the desired final blow-molded product 16, different settings for the size of the primary blow-molded article 12 are required. For those skilled in the art, for each desired final product it will be possible to carry out various tests of the size of the primary blow-molded article 12 to obtain any required setting. Particularly to be noticed is the diameter of the body portion of the intermediate molded article 14. If this body diameter is too large, then when the intermediate molded article 14 is disposed within the final blow mold 104, and the mold is closed, the body portion of the intermediate molded article 14 will be pinched by the parting surfaces of the final blow mold 104. The body diameter of the primary blow-molded article 12 which determines the body diameter of the intermediate molded article 14 may preferably be set to be slightly more than the body diameter of the final blow-molded product 16, but since the amount of shrinking in the radial direction is small compared with that in the axial direction, should not be too great in order to prevent pinching.

The primary blow-molded article 12 is not restricted to the example described above, but may equally be obtained by, for example, the so-called "free blowing" method of forming without using a stretching rod.

The primary blow-molded article 12, as shown in FIG. 2B, comprises a neck portion 20, a shoulder portion 24, a body portion 26, a heel portion 28, and a bottom portion 30. The bottom portion 30 comprises a ground support portion 32 and a raised bottom 34.

The neck portion 20 is not stretched, and the shoulder portion 24, expanding to the body portion 26, forms a region of low stretching. The body portion 26 is thin-walled, having sufficient stretch-orientation, and the heel portion 28 and ground support portion 32 have a decreasing degree of orientation from the body portion 26 to the raised bottom 34. The raised bottom 34 is concave, toward the interior of the container, and is thick-walled, with a low degree of orientation.

It should be noted that by the high degree of stretching particularly of the body portion 26 of this primary blow-molded article 12, strain arising during the stretching remains in the body portion 26.

(C) Intermediate molded article 14

The intermediate molded article 14 is obtained by heat treatment of the primary blow-molded article 12 within the heat treatment mold 102 shown in FIG. 1, followed by shrinking of the primary blow-molded article 12. The intermediate molded article 14 is further subjected to secondary heat treatment within the heating box 106 shown in FIG. 1, but as described below undergoes almost no shrinking in this secondary heat treatment step.

This intermediate molded article 14 has much of the strain from the primary heat treatment in the heat treatment mold 102 eliminated, and is in a state with crystallization promoted.

After heat treatment in the heat treatment mold 102, the intermediate molded article 14 shrunk by the residual strain (the strain which was not removed by the heat treatment) is in an extremely thermally stable state, and this intermediate molded article 14 even if subsequently heated undergoes almost no deformation.

This intermediate molded article 14, as can be seen from a comparison of FIGS. 2C and 2D, is slightly smaller in both the longitudinal and lateral dimensions than the final blow-molded product 16. Here it is preferable for the intermediate molded article 14 to be as close as possible in dimensions to the final blow-molded product 16. However, the size of the final molded product 16 must be determined in view of the possible danger of the intermediate molded article 14 being pinched when the final blow mold 104 (see FIG. 1) is closed.

(D) Final molded product 16

The final blow-molded product 16, as shown in FIG. 2D, has an annular concavity 38, dividing a body 36 into upper and lower parts. The body 36 on the side of the neck portion 20 from the annular concavity 38 is a label attachment portion 40 constituted by a smoothly curving surface, and the body 36 on the side of the bottom portion 30 from the annular concavity 38 has a plurality of panels 42 disposed spaced apart in the circumferential direction and for absorbing reduced pressure.

The raised bottom 34 has substantially the same shape in the primary blow-molded article 12, intermediate molded article 14, and final blow-molded product 16.

Next the primary blow mold 100 in the primary blow molding step and the heating box 106 in the secondary heat treatment step are described.

It should be noted that the heat treatment mold 102 in the primary heat treatment step and the final blow mold 104 in the secondary blow molding step are functionally almost identical to the primary blow mold 100, and detailed description is omitted. Here the primary blow mold 100 and the heat treatment mold 102 are of almost the same construction, including the cavity shape. The final blow mold 104 has a cavity of a shape matching the external shape of the final blow-molded product 16, and differs in this point from the primary blow mold 100 and heat treatment mold 102.

In FIG. 3 is shown a sectional view of the primary blow mold 100.

The preform 10 formed by injection molding is heated to a temperature appropriate for stretching (100 to 120° C.), and disposed within the primary blow mold 100 comprising a pair of split molds and a bottom mold 62.

The preform 10 is mounted in the inverted orientation on a carrier member 46 for carrying the same.

The carrier member 46 is fixed to a transport chain 48 for transporting cyclically on a molding machine (not shown in the drawings), and has a cam follower 52 for moving along a rail 50.

Moreover, in order to rotate the position where the preform 10 is mounted, there is provided a rotating toothed sprocket 54, and a transport pin not shown in the drawing inserted into the neck portion 20 of the preform 10.

Further, below the carrier member 46 is provided a sealing piston 56 for supplying blowing air in the primary blow molding step, the primary heat treatment step, and the secondary blow molding step, rising toward the carrier member 46 and sealing.

The primary blow mold 100 has a cooled neck guide member 58 for positioning the preform 10, and this neck guide member 58 is at a position to be in contact with the neck portion 20. Further, the primary blow mold 100 incorporates eight annular heaters 60 spaced apart vertically, surrounding the region extending from the shoulder portion 24 to the ground support portion 32 of the primary blow-molded article 12.

The temperature of these annular heaters 60 can be varied according to the requirements of heat resistance of the shoulder portion 24, body portion 26, heel portion 28, ground support portion 32, and so on. Moreover, to make the mold construction simple, in place of the plurality of annular heaters 60 may be used a plurality of strip heaters extending in the vertical direction of the primary blow-molded article 12, or a temperature adjustment fluid path. In this case, it is preferable for the plurality of strip heaters 60 to be disposed around the periphery of the primary blow-molded article 12, or for the fluid path to be disposed circumferentially. It is preferable for these strip heaters or temperature adjustment fluid path to be able to provide varying temperature adjustment for each position in the vertical direction.

The bottom mold 62 which contacts a part of the ground support portion 32 and the raised bottom 34 of the primary blow-molded article 12 is provided with a passage 64 through which a heating medium flows.

By means of the circulation of this heating medium, the bottom mold 62 of the primary blow mold 100 is preferably adjusted to a temperature of 90 to 120° C. The reason for heating the bottom mold 62 of the primary blow mold 100 is that there is a danger that it may not be possible to adequately heat the ground support portion 32 and the raised bottom 34 of the primary blow-molded article 12 in the bottom mold 62 of the heat treatment mold 102 shown in FIG. 1. This is because while the primary blow-molded article 12 is undergoing heat treatment in the heat treatment mold 102, the bottom portion 30 is separated from the bottom mold 62 by the effect of thermal shrinkage. If in view of this, the bottom mold 62 of the heat treatment mold 102 is held at a high temperature, undesirable deformation of the bottom portion 30 of the primary blow-molded article 12 occurs. Therefore, the bottom mold 62 of the heat treatment mold 102 must be kept at a rather lower temperature, and as a result it is not possible to apply adequate heat treatment to the bottom portion 30 in the heat treatment mold 102.

Thus, heat treatment of the bottom portion 30 is carried out in the bottom mold 62 of the primary blow mold 100.

Figure 4:
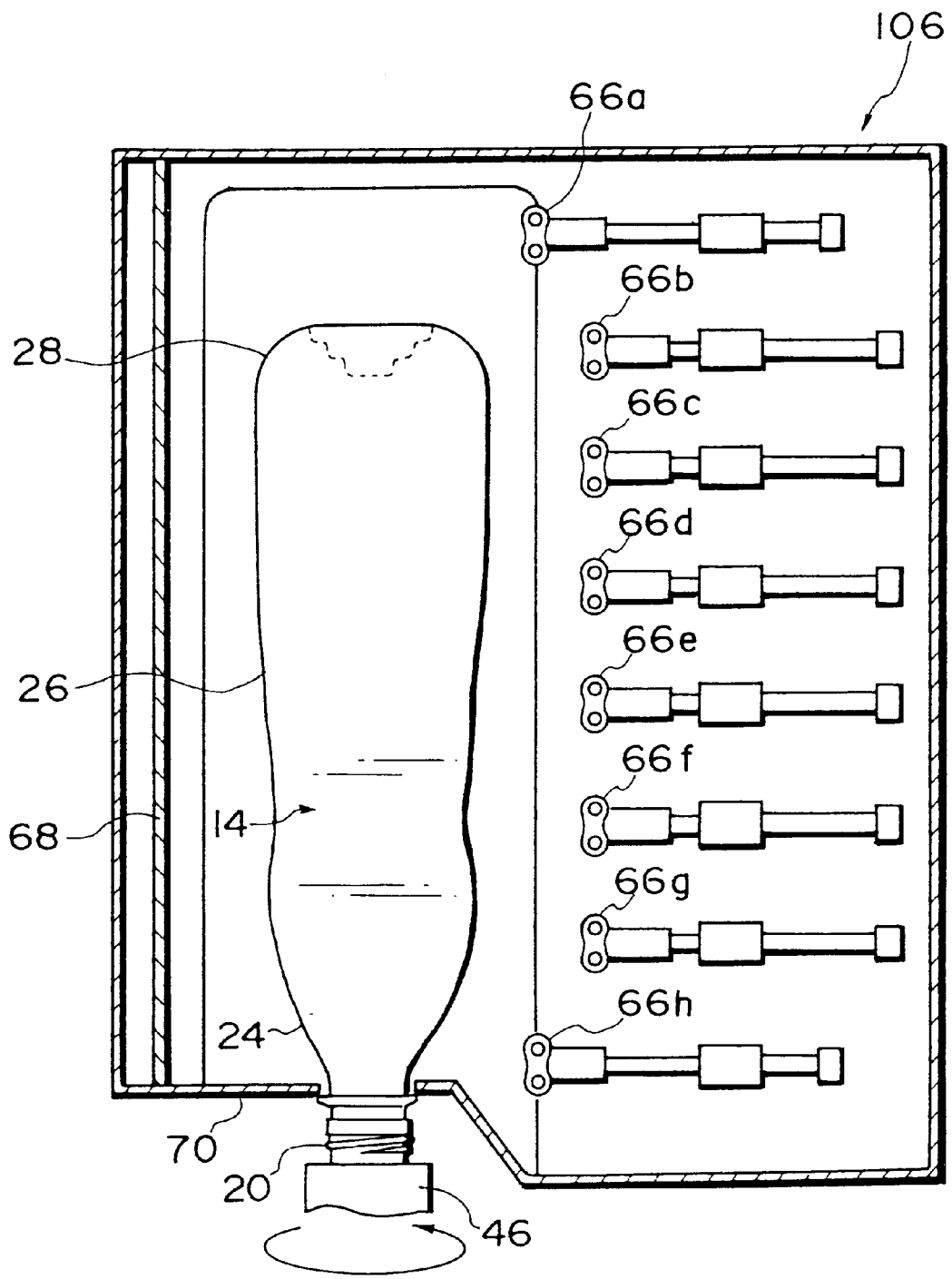
FIG. 4 is a sectional diagram showing a heating box in a secondary heat treatment step.

In FIG. 4, is shown a heating box 106 which heats the intermediate molded article 14 in the shrunken state removed from the heat treatment mold 102 by means of infrared heaters 66a to 66h disposed laterally thereof.

The infrared heaters 66a to 66h are eight in number, disposed at intervals in the vertical direction of the intermediate molded article 14, extending along the transport direction of the intermediate molded article 14 (from behind to in front of FIG. 3).

The type of the infrared heaters 66a to 66h may be selected from long wavelength infrared (far infrared), medium wavelength infrared, or short wavelength infrared (near infrared) as appropriate. In general, plastics are thought of as particularly absorbing medium wavelength infrared radiation, but here short wavelength infrared heaters manufactured by Heraeus (near infrared, maximum energy wavelength 1.0 to 2.0 $\mu$m) were used.

The temperature of the heat emitting elements of the infrared heaters 66a to 66h can be set in the range of approximately 300 to 2000° C. By this means, the temperature to which the intermediate molded article 14 is heated in the secondary heat treatment step is set to be the same as or above the temperature of the heat treatment mold 102. It should be noted that in order that the intermediate molded article 14 undergoes almost no shrinking in the secondary heat treatment step, it is preferable for the intermediate molded article 14 to be heated to between 150 and 220° C.

Next, the power supply to each of the infrared heaters 66a to 66h, or their distance from the intermediate molded article 14 is preferably adjusted in order that the temperature of the intermediate molded article 14 does not rise excessively.

As shown in FIG. 4, the infrared heaters 66a and 66h opposing the shoulder portion 24 and heel portion 28 are preferably disposed closer to the vertical axis of the intermediate molded article 14 than are the infrared heaters 66b to 66g.

This is partly because the shoulder portion 24 and heel portion 28 have a smaller diameter than the rest of the body portion 26, but also because the greater wall thickness compared with the rest of the body portion 26 means that the shoulder portion 24 and heel portion 28 have a lower heating efficiency and this serves to ensure that an adequate quantity of heat is supplied.

It is effective to supply more power to the infrared heaters 66a and 66h compared with the others.

Since the intermediate molded article 14 is transported into the heating box 106 already having undergone shrinking, it can be accurately established which height positions of the infrared heaters 66a to 66h correspond to which regions of the intermediate molded article 14. However, various adjustments of the infrared heaters 66a to 66h, such as for example height adjustments, can be carried out if required for a purpose.

On the opposite side of the transport path of the intermediate molded article 14 from the infrared heaters 66a to 66h is provided a reflector 68. This is used to effectively employ infrared rays which have passed through the intermediate molded article 14. It should be noted that the intermediate molded article 14 is rotated as it passes through the heating box 106. This ensures that the intermediate molded article 14 is heated uniformly in the circumferential direction.

Close to the neck portion 20 of the intermediate molded article 14, to protect the neck portion 20 from the infrared rays is provided a shield plate 70 on both sides of the transport path of the intermediate molded article 14.

The shield plate 70 is fixed, but if the heating of the intermediate molded article 14 within the heating box 106 is carried out in the stationary state, the shield plate 70 may equally be such as to be opened and closed on the stopping position.

Next the method of molding a heat-resistant container according to an embodiment of the present invention is described.

Step of forming a preform

First an amorphous preform 10 in the form of a tube with a bottom as shown in FIG. 2A is formed by injection molding in an injection molding machine. A piece formed from heat resistant resin is previously inserted in the mold. This piece has the shape corresponding at least to the threaded portion 22. Then the preform mold cooled to 10 to 30° C. is filled with molten PET resin. By this means, a preform 10 is formed by injection molding in which at least the threaded portion 22 has heat resistance.

Next, the preform 10 thus formed by injection molding is mounted on the carrier member 46 and transported to the primary blow molding step (See FIG. 1).

When the heat from the injection molding of the preform 10 is used (the hot parison method), the preform 10 is removed at an early stage from the preform mold, and the preform 10 is transported by the carrier member 46 while still hot.

If the heat from the injection molding of the preform 10 is not used (the cold parison method), the preform 10 is first adequately cooled in the preform mold, and then the preform 10 is removed. Thereafter, the preform 10 is carried to a reheating station not shown in the drawings, then after heating by infrared heaters or the like to 100 to 120° C., the preform 10 is mounted on the carrier member 46 and transported.

Primary blow molding step

Next, the preform 10 transported by the carrier member 46 is disposed within the primary blow mold 100, which is opened, and cooled to about 30° C. After clamping the primary blow mold 100 the preform 10 is subjected to biaxial stretch blow molding by means of a stretching rod and compressed gas to obtain a primary blow-molded article 12 (see FIG. 1).

This primary blow-molded article 12 is formed to be longer in the vertical direction than the final blow-molded product 16, in view of the shrinking during the primary heat treatment step. In this embodiment, the primary and secondary heat treatment steps are carried out respectively within the heat treatment mold 102 and the heating box 106 outside the mold. Therefore, compared with the case in which heat treatment is carried out once only, outside the mold, the amount of shrinkage from the primary blow-molded article 12 to the intermediate molded article 14 is very much less, and particularly the difference in amount of shrinkage in the vertical direction is marked. The reason for this is that if heating is carried out only outside the mold, the primary blow-molded article shrinks freely under residual stress, and this amount of shrinkage is relatively large. On the other hand, if heat treatment is carried out by means of contact with the heat treatment mold as in this embodiment, while the primary blow-molded article and heat treatment mold are in contact the residual strain in the primary blow-molded article is eliminated by means of crystallization. When the primary blow-molded article is removed from the heat treatment mold, the residual strain which was not completely eliminated causes the primary blow-molded article to shrink to form the intermediate blow-molded article, but the amount of this shrinkage is extremely small.

Therefore, compared with the case in which the heat treatment is carried out only outside the mold, the mold and mold clamping mechanism for the primary blow molding can be made more compact, and since the heat treatment is carried out at high efficiency by contact, the space required for heat treatment can also be saved. As a result, there is the advantage that the primary blow mold 100 and mechanism associated therewith can be made more compact.

After the completion of the primary blow molding step, the interior of the primary blow-molded article 12 is evacuated, and then the primary blow mold 100 is opened. The primary blow-molded article 12 removed from the primary blow mold 100 is transported by the carrier member 46 toward the heat treatment mold 102.

Primary heat treatment step

The primary blow-molded article 12 transported by the carrier member 46 is disposed within the heat treatment mold 102, which is opened, and heated to a temperature of 150 to 200° C. As shown in FIG. 1, after the heat treatment mold 102 is clamped, compressed air at 5 to 25 kg/cm$^2$ is introduced into the primary blow-molded article 12, and the outer surface of the primary blow-molded article 12 is brought into intimate contact with the cavity surface of the heat treatment mold 102 for on the order of 2 to 10 seconds, to carry out primary heat treatment.

If the primary heat treatment time is short, productivity is improved, but the degree of crystallization of the intermediate molded article 14 obtained from shrinkage after this heat treatment is low, and the strain is not completely eliminated. If the primary heat treatment time is long, the degree of crystallization is high, the strain is completely eliminated, and almost no shrinkage of the primary blow-molded article 12 occurs, but the productivity is poor.

The setting of this primary heat treatment time may be carried out by appropriate selection according to the manufacturing objectives, but a value in the range of 2 to 10 seconds or thereabouts is appropriate both from the viewpoint of productivity and for the assurance of maintaining heat resistance.

After the completion of primary heat treatment by the heat treatment mold 102, the interior of the primary blow-molded article 12 is evacuated, and then the heat treatment mold 102 is opened. In this way the primary blow-molded article 12 shrinks and the strain is eliminated, and the intermediate molded article 14, slightly smaller both longitudinally and laterally than the final molded product 16 is obtained.

Secondary heat treatment step

The intermediate molded article 14 is transported by the carrier member 46 to the heating box 106. As shown in FIG. 1, the intermediate molded article 14 disposed within the heating box 106 is adequately heated by the infrared heaters 66a to 66h.

The heat treatment temperature of the intermediate molded article 14 in this secondary heat treatment step is preferably the same as or more than the temperature of the heat treatment mold 102, promoting the crystallization obtained in the primary heat treatment step.

Since the intermediate molded article 14 has had the strain already eliminated by the shrinkage in the primary heat treatment step, in the secondary heat treatment heating is possible with almost no shrinkage. Therefore, in the secondary heat treatment step, whose objective is the promotion of crystallization a means to restrict the shrinkage deformation of the intermediate molded article 14 is not necessarily required. In this secondary heat treatment step, in contradistinction to the primary heat treatment step using the heat treatment mold 102, compressed gas need not be introduced into the intermediate molded article 14, and therefore after the secondary heat treatment, evacuation of the intermediate molded article 14 is not required, and the problem of a fall in temperature of the intermediate molded article 14 caused by such an evacuation does not occur.

Any fall in temperature of the intermediate molded article caused by evacuation in the primary heat treatment step is compensated for by the secondary heat treatment step, improving the dimensional accuracy of the final blow-molded product.

It should be noted that it might be considered to use the heat treatment mold 102 also for the secondary heat treatment step. However, in addition to increasing the mold cost, in a secondary heat treatment step in which high pressure gas is used, after such a secondary heat treatment step the influence of the fall in temperature of the intermediate molded article 14 due to the evacuation would be large, and so the method of the present embodiment is superior.

In this secondary heat treatment step, the intermediate molded article 14 is heated while rotating, and thus heating is uniform in the circumferential direction. Moreover, the infrared heaters 66a and 66h at the upper and lower ends are able to radiate heat at the shoulder portion 24 and heel portion 28 from positions closer than the other infrared heaters. For this reason, portions of the intermediate molded article 14 for which heat treatment was inadequate are adequately heat treated, and the crystallization of the whole of the intermediate molded article 14 is improved.

By means of these primary and secondary heat treatments, the time for the primary heat treatment within the heat treatment mold 102 can be reduced. As a result, while improving the heat resistance, the productivity can also be improved.

Secondary (final) blow molding step

The intermediate molded article 14 for which the secondary heat treatment has been completed is transported by the carrier member 46 to the final blow mold 104. After the intermediate molded article 14 has been disposed in the final blow mold 104 in the mold open state, the final blow mold 104 is clamped. Thereafter, as shown in FIG. 1, the intermediate molded article 14 is blow-molded and the final molded product 16 is obtained. Because the temperature of the intermediate molded article in the final blow molding step is maintained high, it is considered that almost no strain occurs during the final blow molding. However, a certain degree of new strain occurs as a result of the stretching during the final blow molding. To prevent any loss of heat resistance due to this strain, the final blow mold 104 is preferably heated to a temperature higher than the heat resistance temperature required of the final blow-molded product 16, and in particular to a temperature above the glass-transition point (70° C. or thereabouts for PET resin). In this embodiment, the final blow mold 104 is heated to between 80 and 130° C.

In this final blow molding step, when the final blow mold 104 is closed, there is no danger of the intermediate molded article 14 being pinched, and efficient molding is possible. The reason for this is that the form of the primary blow mold 100 and heat treatment mold 102 is designed so that the intermediate molded article 14 is smaller than the final blow-molded product 16. Furthermore, the intermediate molded article 14 has an extremely stable shrunken state after the primary heat treatment step, with little eccentricity or localized distortion, and since further shrinking due to the secondary heat treatment step is almost nonexistent the shape and size of the intermediate molded article 14 are stable.

Furthermore, since the intermediate molded article 14 is subject to heat treatment in the secondary heat treatment step, there is no fall in temperature in the final blow molding step, and the appropriate stretching temperature is maintained in the secondary blow molding step. As a result, in the secondary blow molding step, the final molded product 16 is obtained with an outer form coinciding with the cavity surface of the final blow mold 104, and the dimensional accuracy thereof is improved. Moreover, in the secondary heat treatment step, since adequate heat treatment is applied to the shoulder portion 24 and the heel portion 28, the heat resistance of those portions can be improved.

After the final blow molding, the final blow mold 104 is opened, and as shown in FIG. 1, the final molded product 16 is removed, whereupon one molding cycle is completed.

The present invention is not restricted to the embodiment described above, and various modifications can be made within the scope of the invention.

For example, in the embodiment described above, the heat treatment mold 102 is provided for carrying out heat treatment, but this example is not limiting, and it is possible to use the primary blow mold 100 to double for primary heat treatment, although it is anticipated that the unfavorable effect on the thickness distribution of the primary blow-molded article will be not small. At this time, the temperature of the primary blow mold 100 may be set to the same temperature as that of the heat treatment mold 102.

In the secondary heat treatment step, infrared heaters were used for the heat treatment, but other methods of noncontact heating, such as hot air or microwaves, are equally possible.

Furthermore, the number and type of the infrared heaters may be varied as is appropriate for the molding conditions.

What is claimed is:

1. A method of molding a heat-resistant container comprising:
    a primary blow molding step in which a preform of a synthetic resin is blow-molded into a primary blow-molded article in a primary blow mold;
    a step of transferring said primary blow molded article from said primary mold to a heat treatment mold;
    a primary heat treatment step in which said primary blow-molded article is held in the heat treatment mold and heat treated for releasing strain;
    a secondary heat treatment step in which a shrunken intermediate molded article removed from said heat treatment mold is subjected to heat treatment outside said heat treatment mold whereby the secondary heat treatment step is performed with almost no shrinkage of the shrunken intermediate article due to strain release from the primary heat treatment step; and
    a secondary blow molding step in which said intermediate molded article having been subjected to said secondary heat treatment step is blow-molded into a final molded product in a final blow mold,
    and wherein said primary heat treatment step includes a step in which said primary blow-molded article disposed within said heat treatment mold is pressurized and subjected to heat treatment, and wherein there is a step in which after said primary heat treatment is completed said primary blow-molded article is evacuated thereby producing the shrunken intermediate article.

2. The method of molding a heat-treatment container as defined in claim 1,
    wherein in said secondary heat treatment step, said intermediate molded article is subjected to heat treatment without introducing a compressed gas into said shrunken intermediate molded article.

3. The method of molding a heat-resistant container as defined in claim 1,
    wherein the heat treatment temperature of said intermediate molded article in said secondary heat treatment step is at least the temperature of said heat treatment mold in said primary heat treatment step.

4. The method of molding a heat-resistant container as defined in claim 1,
    wherein said secondary heat treatment step is carried out by means of a plurality of infrared heaters disposed alongside said intermediate molded article.

5. The method of molding a heat-resistant container as defined in claim 4,
    wherein said secondary heat treatment step includes a step of rotating said intermediate molded article.

6. The method of molding a heat-resistant container as defined in claim 1,
    wherein said secondary heat treatment step is carried out by directing hot air at the outer surface of said intermediate molded article.

7. The method of molding a heat-resistant container as defined in claim 1,
    wherein the temperature of said heat treatment mold used in said primary heat treatment step is in the range of 150 to 220° C., and the heat treatment time is in the range of 2 to 10 seconds.

8. The method of molding a heat-resistant container as defined in claim 1,
    wherein the shape of the cavity of said primary blow mold used in said primary blow molding step is substantially the same as the shape of the cavity of said heat treatment mold used in said primary heat treatment step.

9. The method of molding a heat-resistant container as defined in claim 1, wherein said final blow mold used in said secondary blow molding step is heated to a temperature of at least the glass-transition point of said synthetic resin, and at least the temperature required for heat resistance of said final molded product.

10. A method of molding a heat-resistant container comprising:

a primary blow molding step in which a preform of a synthetic resin is molded into a primary blow-molded article in a primary blow mold;

a step of transferring said primary blow molded article from said primary mold to a heat treatment mold;

a primary heat treatment step in which said primary blow-molded article is held in the heat treatment mold and heat treated;

a secondary heat treatment step in which a shrunken intermediate molded article removed from said heat treatment mold is subjected to heat treatment outside said heat treatment mold; and a secondary blow molding step in which said intermediate molded article having been subjected to heat treatment outside said heat treatment mold is blow-molded into a final molded product in a final blow mold;

wherein in said primary blow molding step the longitudinal length of said primary blow-molded article is formed to be longer than the longitudinal length of said final molded product;

wherein the longitudinal and lateral dimensions of said shrunken intermediate molded article removed from said heat treatment mold after said primary heat treatment step are slightly less than the longitudinal and lateral dimensions of said final molded product;

wherein in said secondary heat treatment step, heat treatment is carried out with almost no shrinkage of said intermediate molded article due to strain release from the primary heat treatment step, and wherein said primary heat treatment step includes a step in which said primary blow-molded article disposed within said heat treatment mold is pressurized and subjected to heat treatment, and wherein there is a step in which after said primary heat treatment is completed said primary blow-molded article is evacuated thereby producing the shrunken intermediate article.

11. A method of molding a heat-resistant container comprising:

a primary blow molding step in which a preform of a synthetic resin is blow-molded into a primary blow-molded article;

a primary heat treatment step in which said primary blow-molded article is held in a heated mold and heat treated;

a secondary heat treatment step in which a shrunken intermediate molded article removed from said mold is subjected to heat treatment outside said mold;

a secondary blow molding step in which said intermediate molded article having been subjected to heat treatment outside said mold is blow-molded into a final molded product in a final blow mold;

wherein said intermediate molded article includes a neck portion with an opening, a tubular body portion, a bottom portion sealing one end of said body portion, a shoulder portion joining said neck portion and said body portion, and a heel portion joining said body portion and said bottom portion; and wherein in said secondary heat treatment step, heat treatment is carried out with the quantity of heat supplied to each of said shoulder and said heel portions being greater than the quantity of heat supplied to said body portion.

12. The method of molding a heat-resistant container as defined in claim 11, wherein said secondary heat treatment step is carried out by means of a plurality of infrared heaters disposed alongside said intermediate molded article; and wherein said plurality of infrared heaters are disposed opposing said shoulder portion, said body portion and said heel portion of said intermediate molded article, and said infrared heaters opposing said shoulder and said heel portions of said intermediate molded article are disposed closer to a longitudinal axis of said intermediate molded article than others of said infrared heaters.

13. A method of molding a heat-resistant container comprising:

a primary blow molding step in which a polyethylene terephthalate preform is blow-molded in a primary mold into a primary blow-molded article with a longitudinal axis which is longer than a longitudinal axis of a final molded product;

a step of transferring said primary blow molded article from said primary mold to a heat treatment mold;

a primary heat treatment step in which said primary blow-molded article is held in the heat treatment mold, the interior of said primary blow-molded article is pressurized, said primary blow-molded article is held in intimate contact with the inner surface of said mold for a period of 2 to 10 seconds, and is subjected to heat treatment in the range of 150 to 220° C. being a temperature to promote crystallization of said polyethylene terephthalate, whereby strain occurring in said primary blow-molded article is eliminated thereby producing a shrunken intermediate article;

a secondary heat treatment step in which said intermediate molded article, removed from said heat treatment mold, and shrunken according to the residual strain of said primary blow-molded article with a body diameter smaller than the body diameter of said final molded product, is subjected to heat treatment by radiant heat of an infrared heater at a temperature to promote crystallization of said polyethylene terephthalate, a secondary blow molding step in which said intermediate molded article having been subjected to heat treatment outside said heated mold is blow-molded into said final molded product in a final blow mold heated to at least the temperature required for heat resistance of said final molded product, and wherein said primary heat treatment step includes a step in which said primary blow-molded article disposed within said heat treatment mold is pressurized and subjected to heat treatment, and wherein there is a step in which after said primary heat treatment is completed said primary blow-molded article is evacuated thereby producing the shrunken intermediate article.

* * * * *